(12) United States Patent
Aher (10) Patent No.: US 11,954,387 B2
(45) Date of Patent: Apr. 9, 2024

(54) METHOD AND SYSTEM FOR EFFICIENT JOB PROCESSING AND SCHEDULING USING PROCESS MINING

(71) Applicant: Konica Minolta Business Solutions U.S.A., Inc., Ramsey, NJ (US)

(72) Inventor: Pritam Aher, Sunnyvale, CA (US)

(73) Assignee: KONICA MINOLTA BUSINESS SOLUTIONS U.S.A., INC., Ramsey, NJ (US)

( * ) Notice: Subject to any disclaimer, the term of this patent is extended or adjusted under 35 U.S.C. 154(b) by 59 days.

(21) Appl. No.: 17/490,214

(22) Filed: Sep. 30, 2021

(65) Prior Publication Data
US 2023/0102319 A1    Mar. 30, 2023

(51) Int. Cl.
*G06F 3/12*    (2006.01)
*G06N 20/00*   (2019.01)

(52) U.S. Cl.
CPC .......... *G06F 3/1262* (2013.01); *G06F 3/1208* (2013.01); *G06F 3/1235* (2013.01); *G06F 3/1268* (2013.01); *G06N 20/00* (2019.01)

(58) Field of Classification Search
CPC ...... G06F 3/1208; G06F 3/1235; G06F 3/126; G06F 3/1262; G06F 3/1263; G06F 3/1264; G06F 3/1268
USPC ...................................................... 358/1.15
See application file for complete search history.

(56) References Cited

U.S. PATENT DOCUMENTS

| 10,761,796 B1 * | 9/2020 | Yokoohji | G06F 3/1203 |
| 2004/0190057 A1 | 9/2004 | Takahashi et al. | |
| 2013/0163037 A1 * | 6/2013 | Huster | G06F 3/1275 358/1.15 |
| 2020/0310724 A1 * | 10/2020 | Aher | G06F 3/1289 |

OTHER PUBLICATIONS

The extended European Search Report issued on Feb. 21, 2023, by the European Patent Office in corresponding European Patent Application No. 22194820.1. (7 pages).

* cited by examiner

*Primary Examiner* — Kent Yip
(74) *Attorney, Agent, or Firm* — BUCHANAN IINGERSOLL & ROONEY PC (57) ABSTRACT

A method, a non-transitory computer readable medium, and a system are disclosed for processing and scheduling print jobs on a plurality of printers. The method includes: collecting job information on one or more past print jobs; collecting job information on a plurality of print jobs currently being processed, each of the plurality of print jobs being assigned to one or more operators from a plurality of operators; generating a process workflow visualization for the plurality of print jobs currently being processed with a processing mining algorithm based on the job information collected on the one or more past print jobs and the job information collected on the plurality of print jobs currently being processed; and displaying the process workflow visualization for the plurality of print jobs currently being processed.

14 Claims, 9 Drawing Sheets

| Job Information | | | | | | Status | Remark |
|---|---|---|---|---|---|---|---|
| Job Id | Output Pages | Job Setting | Operator | In-line | Printer | | |
| 1 | 2340 | A | O1 | IL1 | P1 | Completed | |
| 2 | 2210 | B | O2 | IL2 | P2 | In Process | |
| 3 | 4210 | B | O1 | IL3 | P3 | In Process | Resume print job happened 7 times |

610 → Job Id
620 → Output Pages
630 → Job Setting
640 → Operator
650 → In-line
660 → Printer
670 → Status
680 → Remark

METHOD AND SYSTEM FOR EFFICIENT JOB PROCESSING AND SCHEDULING USING PROCESS MINING

FIELD OF THE INVENTION

The present disclosure relates to a method and system for efficient job process and scheduling using process mining, for example, for use in a print shop.

BACKGROUND OF THE INVENTION

In printing shops, generally, a portion of print jobs, for example, 20% to 25% of jobs can take longer time to execute compare to the other remaining 75% to 80% of the jobs, which can affect the overall productivity of the print shop. Generally, the resources for every job, which can include operator, printer, and finisher will be assigned to each of the jobs by a manager of a print shop. However, the assignment of the operators for jobs is often done randomly by the manager, for example, per availability without using any detailed information on the experience of the operators with, for example, the printers and/or finishers within a print shop. In addition, the manager of the print shop will often predict the total time of the job for each of the printers and select the printer, which takes a shorter time as compared to other printers.

SUMMARY OF THE INVENTION

In consideration of the above issues, it would be desirable to have a method and system for efficient processing and scheduling using process mining, which can also help, for example, improve the overall productivity of the print shop.

In accordance with an aspect, a method is disclosed for processing and scheduling print jobs on a plurality of printers, the method comprising: collecting job information on one or more past print jobs; collecting job information on a plurality of print jobs currently being processed, each of the plurality of print jobs being assigned to one or more operators from a plurality of operators; generating a process workflow visualization for the plurality of print jobs currently being processed with a processing mining algorithm based on the job information collected on the one or more past print jobs and the job information collected on the plurality of print jobs currently being processed; and displaying the process workflow visualization for the plurality of print jobs currently being processed.

In accordance with a further aspect, a non-transitory computer readable medium (CRM) storing computer program code executed by a computer processor that performs a process for processing and scheduling print jobs on a plurality of printers, the process comprising: collecting job information on one or more past print jobs; collecting job information on a plurality of print jobs currently being processed, each of the plurality of print jobs being assigned to one or more operators from a plurality of operators; generating a process workflow visualization for the plurality of print jobs currently being processed with a processing mining algorithm based on the job information collected on the one or more past print jobs and the job information collected on the plurality of print jobs currently being processed; and displaying the process workflow visualization for the plurality of print jobs currently being processed.

In accordance with another aspect, a system is disclosed for processing and scheduling print jobs, the system comprising: one or more client devices configured to generate print jobs; a plurality of printers configured to print the print jobs; and a server having a memory and a processor, the processor configured to: collect job information on one or more past print jobs; collect job information on a plurality of print jobs currently being processed, each of the plurality of print jobs being assigned to one or more operators from a plurality of operators; generate a process workflow visualization for the plurality of print jobs currently being processed with a processing mining algorithm based on the job information collected on the one or more past print jobs and the job information collected on the plurality of print jobs currently being processed; and display the process workflow visualization for the plurality of print jobs currently being processed.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, it would be desirable to a method and system for efficient job process and scheduling using process mining, for example, for use in a print shop. Process mining is a family of techniques relating the fields of data science and process management, which supports the analysis of operational processes based on event logs. In accordance with an embodiment, the goal of process mining is to turn event data into insights and actions. Process mining, for example, can be an integral part of data science, fueled by the availability of event data and the desire to improve processes. In accordance with an exemplary embodiment, process mining techniques use event data to show what people, machines, and organizations are really doing. Process mining can also provide novel insights that can be used to identify the executional path taken by operational processes and address their performance and compliance problems.

In accordance with an exemplary embodiment, process mining starts by collecting event data, for example, for a print job, past job log information. The past job log information can view a process from a particular angle. Each event in the past job log can contain (1) a unique identifier for a particular process instance (called case id), (2) an activity (description of the event that is occurring), and (3) a timestamp. There may be additional event attributes referring to resources, costs, etc. Data from the collected past job log information can be extracted, and process mining can uses the data, for example, to answer a variety of process-related questions as set forth herein, which can include optimizing resources within a print shop.

Figure 1:
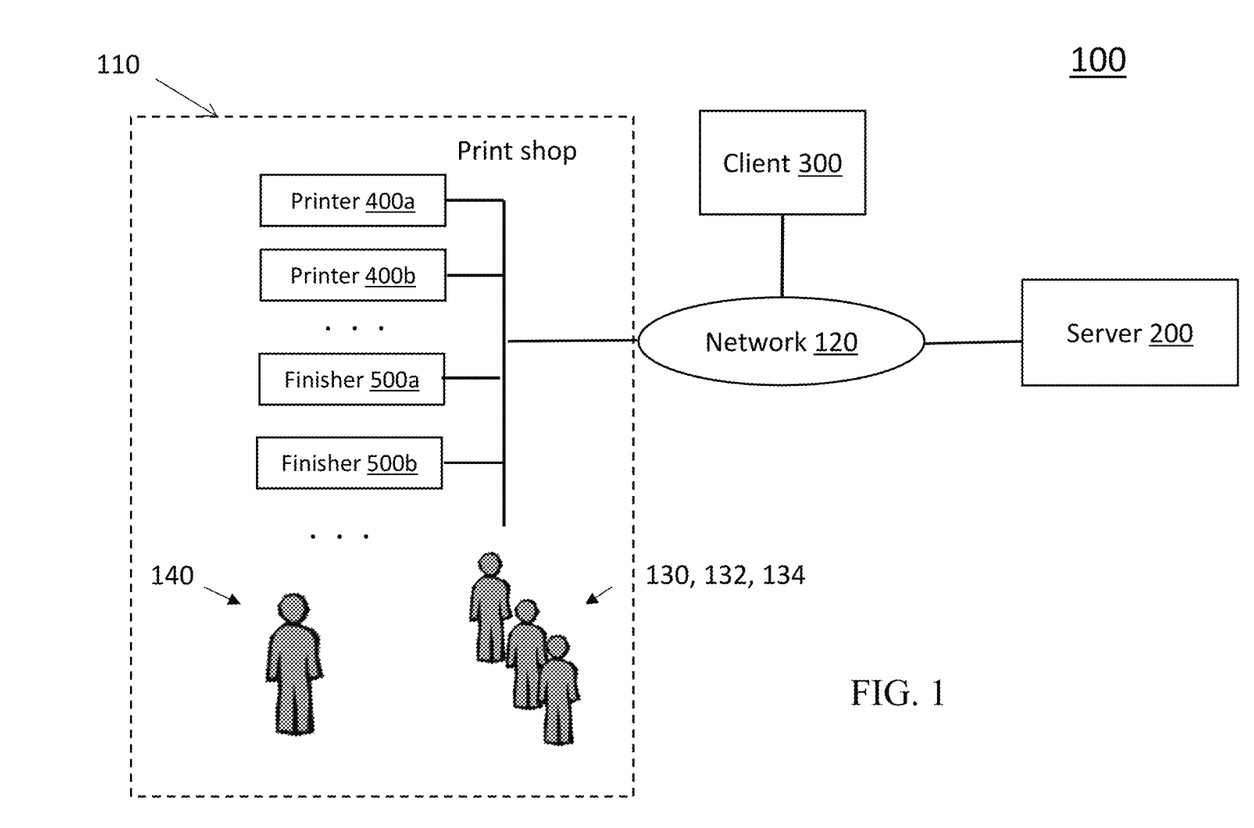
FIG. 1 is an illustration of a system for efficient job processing and scheduling using process mining in accordance with an exemplary embodiment.

FIG. 1 is an illustration of a system 100 for efficient job processing and scheduling using process mining in accordance with an exemplary embodiment. As shown in FIG. 1, the system 100 includes one or more servers 200, one or more client devices 300, one or more printers 400a, 400b, one or more finishers 500a, 500b, and a communication network 120. In accordance with an exemplary embodiment, the one or more printers 400a, 400b, and the one or more finishers 500a, 500b, can be, for example, in a print shop 110. The print shop 110 can have one or more operators 130, 132, which operate the one or more printers 400a, 400b, and the one or more finishers 500a, 500b. The communication network or network 120 can be a public telecommunication line and/or a network (for example, LAN or WAN). Examples of the communication network 120 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

In accordance with an exemplary embodiment, the one or more client devices 300, can be, for example, a personal computer (PC), a laptop, a mobile computing device (e.g., tablet PC, smartphone, etc.), a server, a mainframe, or a kiosk. As shown in FIG. 1, each of the one or more servers 200, the one or more client devices 300, the one or more printers 400a, 400b, and the one or more finishers 500a, 500b, can be connected to each other by one or more communication networks 120 of any size having wired and/or wireless segments. Each of the one or more client devices 300 can be operated by a different user (for example, individual or Customer, company, etc.) and is configured to issue print jobs.

Figure 2:
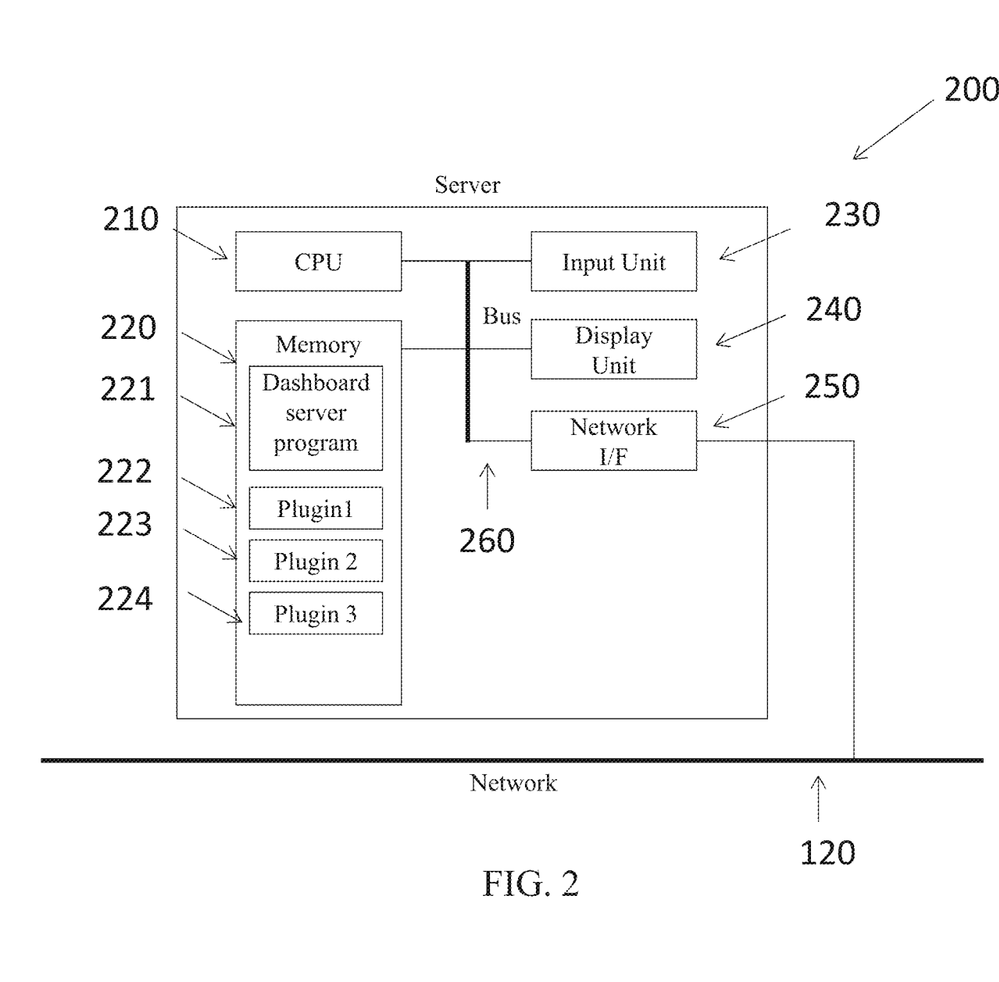
FIG. 2 is an illustration of a server in accordance with an exemplary embodiment.

FIG. 2 is an illustration of a server 200 in accordance with an exemplary embodiment. As shown in FIG. 2, each of the one or more servers 200 can include a processor or central processing unit (CPU) 210, and one or more memories 220 for storing software programs and data, which can include a dashboard server program 221, and a plurality of plugins, for example, Plugin 1 222, Plugin 2 223, and Plugin 3 224. Each of the plurality of plugins 222, 223, 224, can be a software component that adds a specific feature to an existing computer program as disclosed herein. The processor or CPU 220 is configured to carry out the instructions of a computer program, which operates and/or controls at least a portion of the functionality of the server 200. The server 200 can also include an input unit 230, a display unit or graphical user interface (GUI) 240, and a network interface (I/F) 250, which is connected to a communication network (or network) 120. A bus 260 can connect the various components 210, 220, 230, 240, and 250 within server 200. The server 200 includes an operating system (OS), which manages the computer hardware and provides common services for efficient execution of various software programs as disclosed herein.

Figure 3:
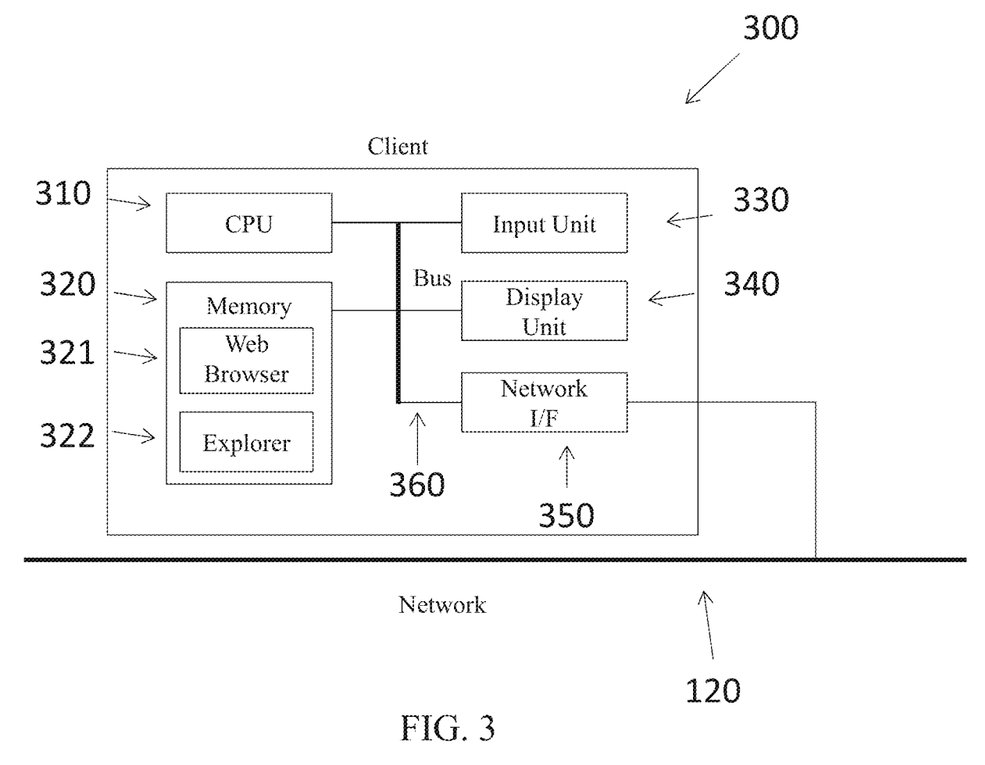
FIG. 3 is an illustration of a client device or client computer in accordance with an exemplary embodiment.

FIG. 3 is an illustration of a client device or client computer 300 in accordance with an exemplary embodiment. As shown in FIG. 3, the client device or client computer 300 can include a processor or central processing unit (CPU) 310, and one or more memories 320 for storing software programs and data (such as files to be printed), and a web browser 321, for example, Internet Explorer 322. The processor or CPU 310 carries out the instructions of a computer program, which operates and/or controls at least a portion of the functionality of the client computer 300. The client computer 300 can also include an input unit 330, a display unit or graphical user interface (GUI) 340, and a network interface (I/F) 350, which is connected to a communication network (or network) 120. A bus 360 can connect the various components 310, 320, 330, 340, and 350 within the client computer 300.

The client computer 300 includes an operating system (OS), which manages the computer hardware and provides common services for efficient execution of various software programs. The software programs can include, for example, application software and printer driver software. In addition, the printer driver software can control transmission of the print job from the client computer 300 to the one or more servers 200, the one or more printers or printing devices 400a, 400b, and the one or more finishers 500a, 500b.

Figure 4:
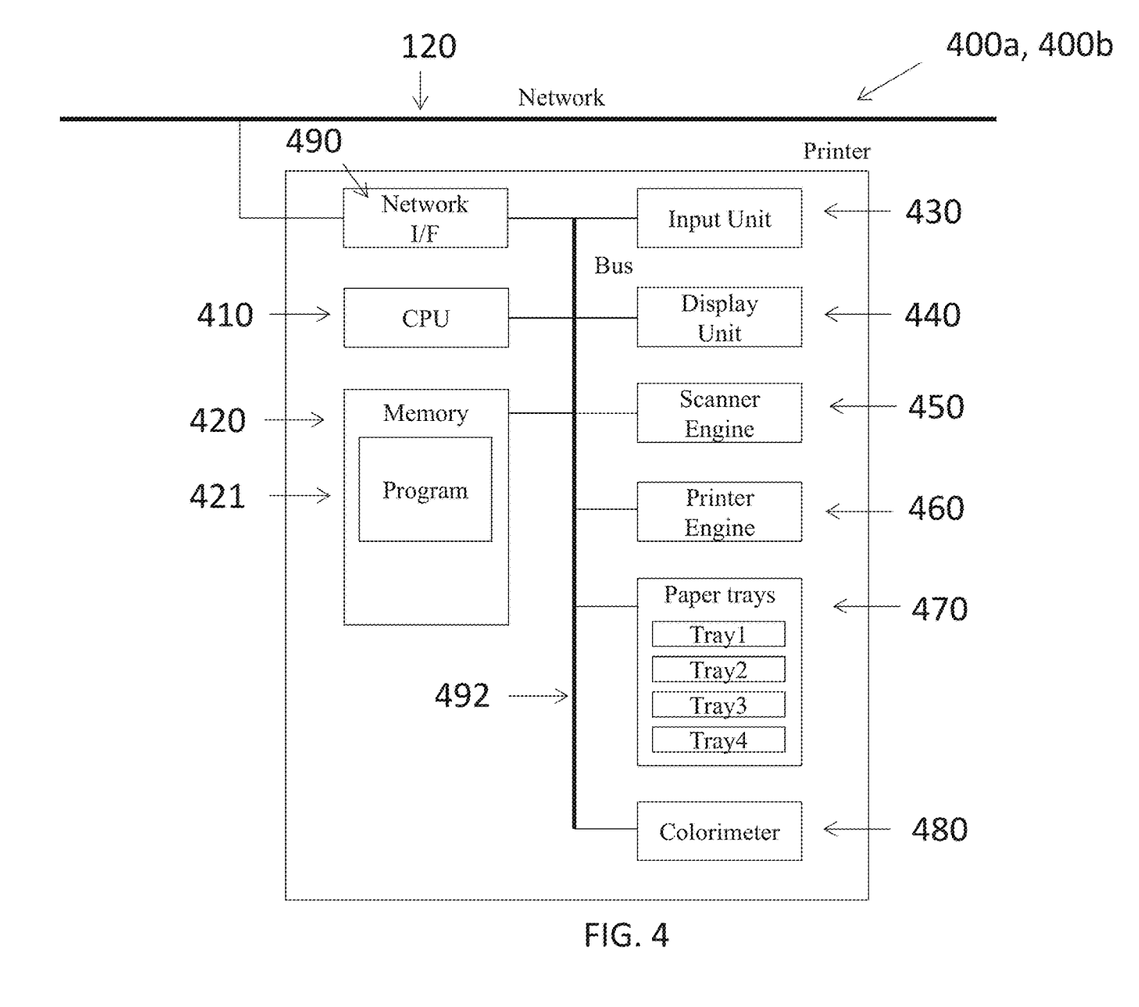
FIG. 4 is an illustration of a printer or printing device in accordance with an exemplary embodiment.

FIG. 4 is an illustration of a printer or printing device 400a, 400b in accordance with an exemplary embodiment. As shown in FIG. 4, the printer or printing device 400a, 400b can include a network interface (I/F) 490, which is connected to the communication network (or network) 120, a processor or central processing unit (CPU) 410, and one or more memories 420 for storing software programs and data (such as files to be printed) 421. For example, the software programs 421 can include a printer controller and a tray table. The processor or CPU 410 carries out the instructions of a computer program, which operates and/or controls at least a portion of the functionality of the printer 400a, 400b. The printer 400a, 400b can also include an input unit 430, a display unit or graphical user interface (GUI) 440, a scanner engine (or scanner) 450, a printer engine 460, a plurality of paper trays 470, and a colorimeter 480.

In accordance with an exemplary embodiment, the colorimeter 480 can be an inline colorimeter (ICCU) (or spectrophotometer), which measures printed color patches in order to generate color profiles. In accordance with an exemplary embodiment, for example, the colorimeter (or spectrophotometer) 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 492 can connect the various components 410, 420, 430, 440, 450, 460, 470, 480, and 490 within the printer 400a, 400b. The printer 400a, 400b also includes an operating system (OS), which manages the computer hardware and provides common services for efficient execution of various software programs. In accordance with an exemplary embodiment, it can be within the scope of the disclosure for the printer 400*a*, 400*b* to be a copier.

For example, in accordance with an exemplary embodiment, an image processing section within the printer 400*a*, 400*b* can carry out various image processing under the control of a print controller or CPU 410, and sends the processed print image data to the print engine 460. The image processing section can also include a scanner section (scanner engine 450) for optically reading a document, such as an image recognition system. The scanner section receives the image from the scanner engine 450 and converts the image into a digital image. The print engine 460 forms an image on a print media (or recording sheet) based on the image data sent from the image processing section. The central processing unit (CPU) (or processor) 410 and the memory 420 can include a program for RIP processing (Raster Image Processing), which is a process for converting print data included in a print job into Raster Image data to be used in the printer or print engine 460. The CPU 410 can include a printer controller configured to process the data and job information received from the one or more servers 200, or the one or more client computers 300, for example, received via the network connection unit and/or input/output section (I/O section) 490.

The CPU 410 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client computers 300 to generate a print image.

In accordance with an exemplary embodiment, the network I/F 490 performs data transfer with the one or more servers 200, and the one or more client devices 300. The printer controller can be programmed to process data and control various other components of the multi-function peripheral to carry out the various methods described herein. In accordance with an exemplary embodiment, the operation of printer section commences when the printer section receives a page description from the one or more servers 200, and the one or more client devices 300 via the network I/F 490 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 400*a*, 400*b* consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, the printer 400*a*, 400*b* can also include at least one auto tray or paper tray 470, and more preferably a plurality of auto trays or paper trays. Each auto tray or paper tray 470 can include a bin or tray, which holds a stack of a print media (not shown), for example, a paper or a paper-like product. The printer engine or print engine 460 has access to a print media of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

In accordance with an exemplary embodiment, the print media is preferably a paper or paper-like media having one or more print media attributes. The print media attributes can include, for example, paper color, coating, grain direction, printing technology, brightness, CIE, tint, whiteness, lab-Color, etc. In order to maximize print quality, the print media attributes of each type of print media should be input into or hosted on the printer 400*a*, 400*b*, for example, on printer configuration settings of the printer 400*a*, 400*b* to obtain the highest quality output. Most print media is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

Figure 5:
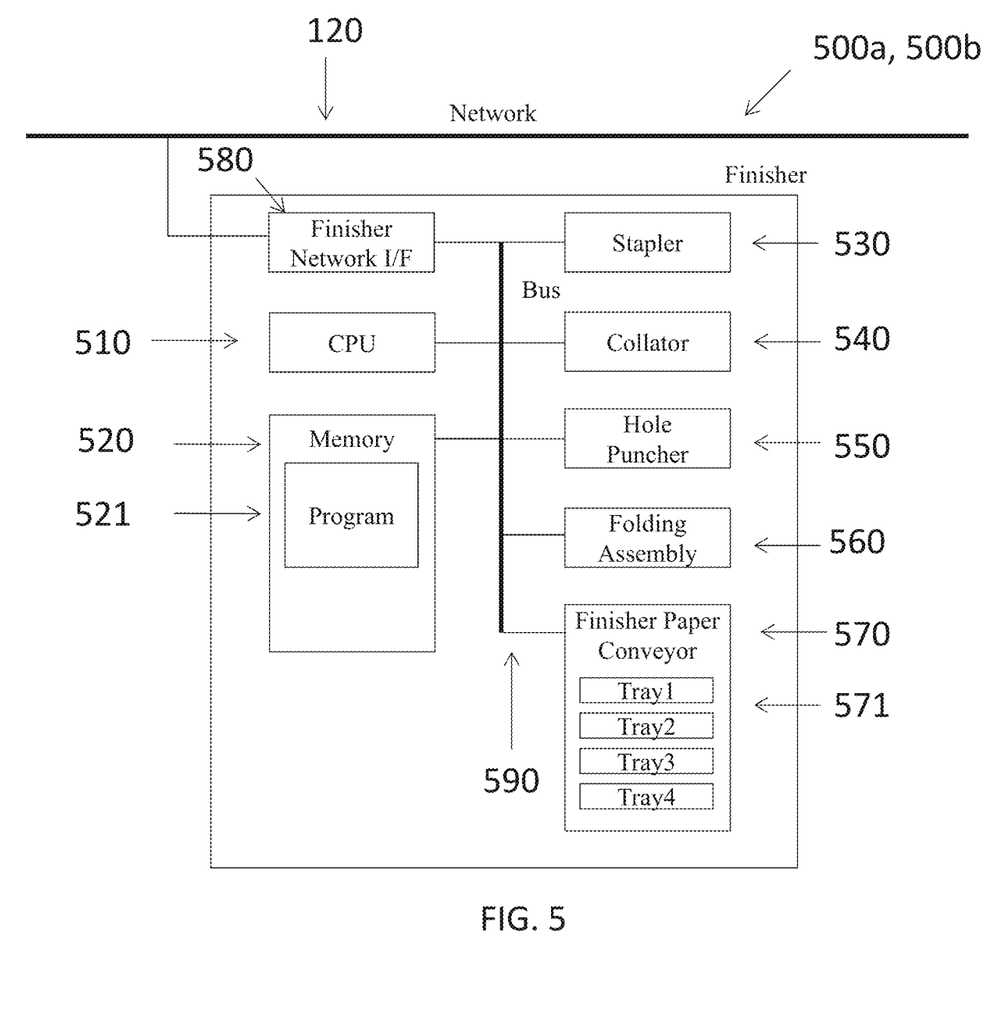
FIG. 5 is an illustration of a finisher in accordance with an exemplary

FIG. 5 is an illustration of a finisher 500*a*, 500*b* in accordance with an exemplary embodiment. As shown in FIG. 5, the finisher 500*a*, 500*b* can include a network interface (I/F) 580, which is connected to the communication network (or network) 120, a processor or central processing unit (CPU) 510, and one or more memories 520 for storing software programs and data (such as files to be printed) 521. The processor or CPU 510 carries out the instructions of a computer program, which operates and/or controls at least a portion of the functionality of the finisher 500*a*, 500*b*. The finisher 500*a*, 500*b* can also include a stapler 530, a collator 540, a hole puncher 550, a folding assembly 560, and a finisher paper conveyor 570, which includes a plurality of trays 571. A bus 590 can connect the various components 510, 520, 530, 540, 550, 560, 570, and 580 within the finisher 500*a*, 500*b*. The finisher 500*a*, 500*b* also includes an operating system (OS), which manages the computer hardware and provides common services for efficient execution of various software programs.

The CPU 510 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the network UF 580 performs data transfer with the one or more servers 200, the one or more client devices 300, and the one or more printers 400*a*, 400*b*.

In accordance with accordance with an exemplary embodiment, a manager 110, for example, of a print shop can use the process mining information to assign the resources for a print job, for example, to a particular operator 130, printer 400*a*, and a finisher 500*a* instead of randomly assigning the print job, for example, to an operator 130, 132, 134, a printer 400*a*, 440*b*, and a finisher 500*a*, 500*b*. In particular, through the use process mining, a print shop 110 can improve the success rate and print time of print jobs from start to finish. In addition, process mining can help provide in depth analysis and root cause analysis of the low performing jobs both overall and individually. In accordance with an exemplary embodiment, machine learning can be used to provide a recommendation in combination with the use of process mining, which can provide an in depth analysis of past data as well as there is way to manipulate the ongoing processes and change the resources dynamically with recommendations.

Process mining can also be used to improve the overall productivity, for example, of the print shop. For example, a manager of a print shop can use the process mining information to assign the resources for the job, which can include one or more operators 130, 132, 134, one or more printers 400*a*, 400*b*, and one or more finishers 500*a*, 500*b* instead of randomly assigning operators 130, 132, 134, printers 400*a*, 400*b*, and finishers 500*a*, 500*b* to the jobs. Thus, through the method and system as disclosed herein, the success rate of the job from start to finish can be improved. In addition, through the use of process mining, the method and system as disclosed can provide in depth analysis and root causes of the low performing jobs overall and individually.

In accordance with an exemplary embodiment, a system is disclosed that collects information from multiple sources including past job logs, for example, collecting past job log information, and current jobs in process, for example, current job workflow information which are in progress. In accordance with an exemplary embodiment, based on the collected data, the system can use the past job log information and obtain information, for example, operator's 130, 132, performance history of operators 130, 132, 134, for example, with printers 400*a*, 400*b*, and finishers 500*a*, 500*b*, through the use of process mining. The system can also generate a process workflow visualization for jobs currently being processed with additional detailed information. For example, if the current job in process is taking longer than expected and/or will not be completed before a deadline, for example, closing time of the print shop, the method and system as disclosed can indicate to a manager of the shop that a change in resources is necessary to finish the job so that the job can be completed before the corresponding deadline. In addition, the system 100 can provide the manager of the print shop with remarks or suggestions to optimize change in resources so that the one or more jobs currently being processed can be completed in a timely manner.

In accordance with an exemplary embodiment, the system can be configured to collect information on past jobs, for example, jobs completed within the past day, week, month(s), or year(s) including job activity information and job setting information. The job activing information can include, for example, a job identifier (job ID), activing or type of print job, resources used including printer 400*a*, 400*b*, finisher 500*a*, 500*b*, and operator(s) 130, 132, and timestamps including start time(s) and finish time(s) for each of the processes or steps associated with the job.

In accordance with an exemplary embodiment, the job setting information can includes a job identifier (job ID), printer 400*a*, 400*b*, finisher 500*a*, 500*b*, operator 130, 132, output pages, and timestamps associated with start time(s) and end time(s) for each of the processes.

In accordance with an exemplary embodiment, the past collected job activity information can be used for processing using a process mining technology to obtain ideal process information and ideal operator information. For example, the past collected job setting information can be used and processed with a machine learning technology to obtain trained models, and the trained models can be used to obtain estimated job processing times.

In accordance with an exemplary embodiment, the information collected on the jobs currently being processed can include activity for all the jobs that are currently being processed including job identifier(s) (job IDs), activity (i.e., printing and/or finishes), resources (i.e., printers 400*a*, 400*b*, and/or finishers 500*a*, 500*b*), and timestamps for start and end times for each of the resources. The information obtained on the jobs currently being processed can be used to generate a visualized graph using process mining technology, and jobs that are taking longer than expected to execute can be highlighted with suggested courses of action to complete the job or jobs within any parameters, for example, closing time, delivery dates and/or delivery times, etc.

In accordance with an exemplary embodiment, the activity can be defined as a product type, which can include, for example, brochure, book, manual, DM (direct mail), business cards (i.e., Biz Card), statement, book, and/or collateral. In addition, the activity can further include types of print jobs, for example, black and white (i.e., B&W) and/or color, page count can be for example, between 1 and 1000, for example, as shown 50, 100, 150, 200, 300, and 400 pages, and the number of copies can be, for example, between 1 and 1000. In addition, the finishers 500*a*, 500*b*, can perform one or more of stitching, punching, and/or folding.

Figure 6:
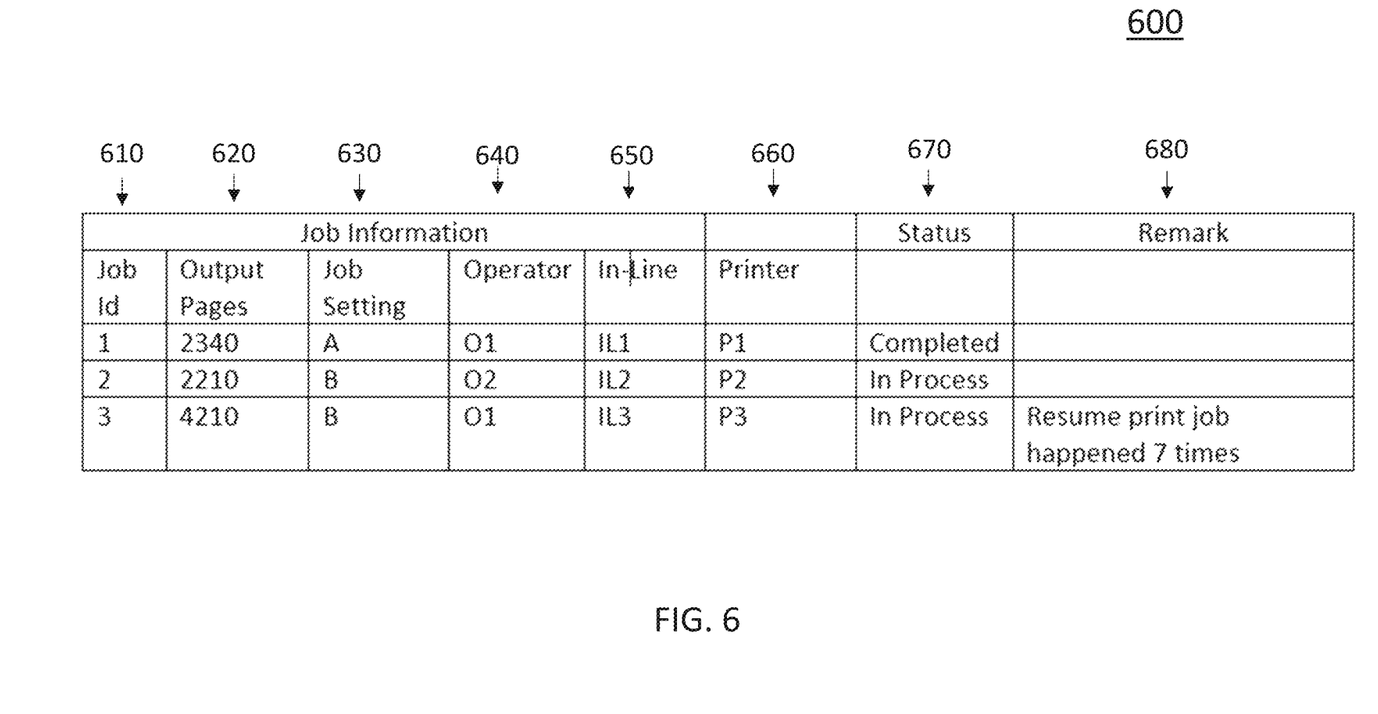
FIG. 6 is an illustration of a graphical user interface (GUI) that can display the status of a plurality of print jobs in accordance with an exemplary embodiment.

FIG. 6 is an illustration of a graphical user interface (GUI) 600 that can be displayed for example, on a client 300 illustrating the status of a plurality of print jobs in a print shop 110. For example, the status and corresponding information 610 on the plurality of print jobs can include job id 610, output pages 620, job setting 630, operator 640 (e.g., operator 130, 132), in-line finisher 650 (e.g., finisher 500*a*, 500*b*), printer 660 (printer 400*a*, 400*b*), status 670, and remarks 680. For example, as shown in FIG. 6, the remarks 680 can include, for example, that Job Id 3 has experienced multiple resume print job, for example, 7 times. In accordance with an exemplary embodiment, the resume print job status, for example, can be related to a maintenance issue with the printer 400*a*, 440*b*, which can include replacing or cleaning parts, color calibration, adding toner, machine failure, machine error status, for example, out of paper or print media, or loading of paper or print media.

Figure 7:
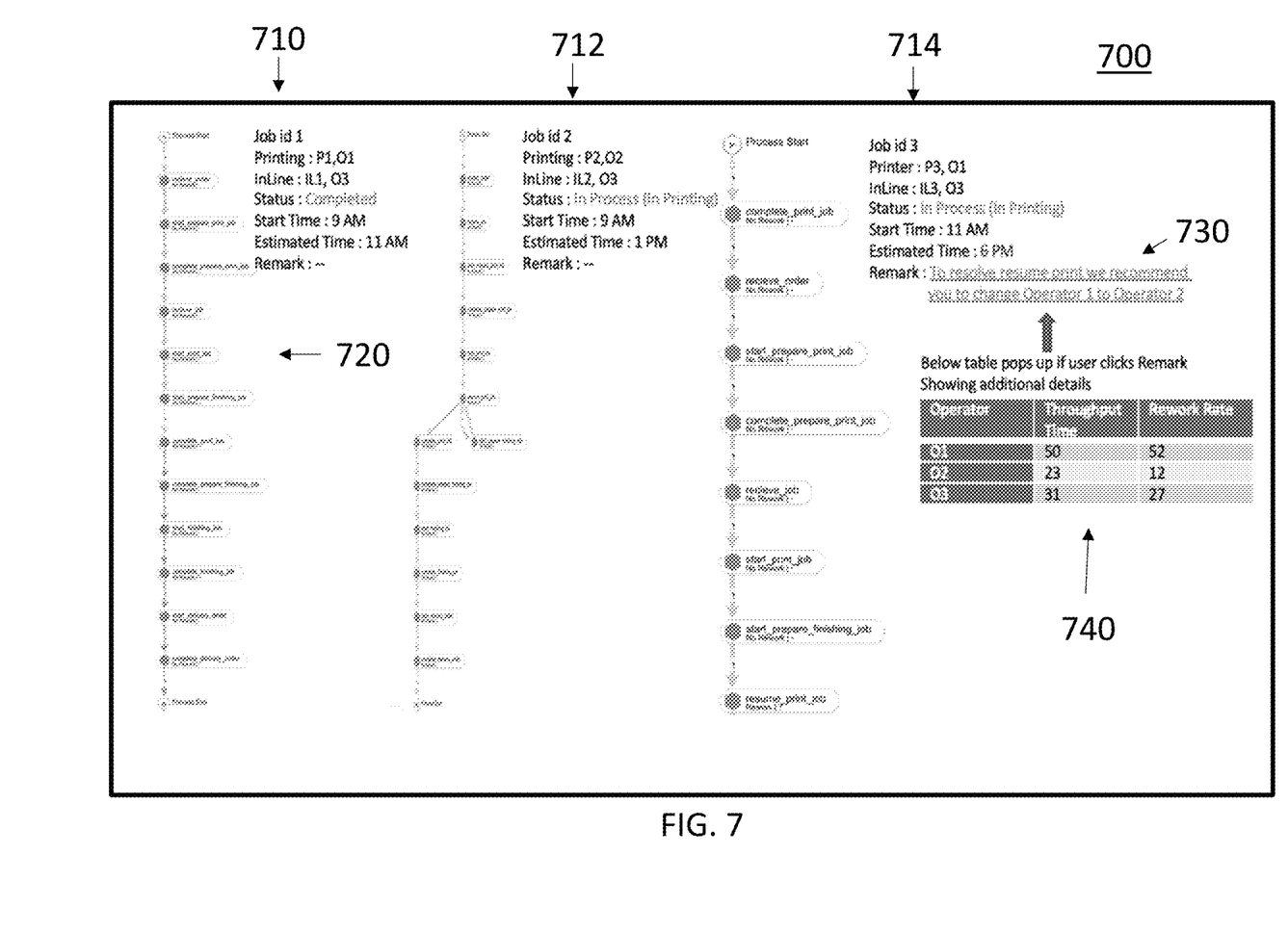
FIG. 7 is an illustration of a workflow visualization for a plurality of print jobs in accordance with an exemplary embodiment.

FIG. 7 is an illustration of a workflow visualization 700 for a plurality of print jobs in accordance with an exemplary embodiment. As shown in FIG. 7, the workflow visualization 700 can include for each of the plurality of print jobs 710, 712, 714, a "Job id" (i.e., job identifier), "Printing" (i.e., print identifier), which identifies the printer 400*a*, 400*b*, and an operator 130, 132, 134, an optional "InLine", which identifies, for example, an inline finisher and corresponding operator 130, 132, 134, for the finisher 500*a*, 550*b*, "Status", "Start Time", "Estimated Time" (i.e., an estimated finish time, and "Remarks".

In accordance with an exemplary embodiment, the workflow visualization 700 can includes a process flow chart 720, which includes, for example, symbols that correspond to a status of the job including printing status and/or finisher status with corresponding symbols for "Process Start", "receive_order", "start_prepare_print_job", "complete_prepare_print_job", "receive_job", "start_print_job", "start_prepare_finishing_job", "complete_print_job", "complete_prepare_finishing_job", "start_finishing_job", "complete_finishing_job", "start_delivery_order", "complete_delivery_order", and "Process End". Each of the statuses can also include an indication if the step or process needs to be repeated or redone, i.e., "Rework" or not, i.e., "No Rework". For example, if one or more of the steps in completing the printing and/or finishing process needs to be redone, for example, as result of maintenance issue, the flowchart can indicated that the status of the print process in a color, for example, red or purple, which is different from a status of print process that has been successfully completed, for example, the stats of the print process that does not need to be reworked can be blue or green. In addition, each of the print process can include a symbol, for example, an oval, a square, or other geometric shape, which illustrates the current status of each of the steps or processes in completing the print job.

In accordance with an exemplary embodiment, if a maintenance issue has caused a delay and/or the print job will not be completed within a define period of time, for example, closing of the print shop 110, or a deadline for delivery of the print job to a customer, the process workflow visualization can include a "Remark", for example, "To resolve resume print, we recommend you to change Operator 1 to Operator 2 730. In addition, the estimated time for completion if currently scheduled outside of the defined period of time may also be shown in a different color. In addition, the Remark "To resolve resume print, we recommend you to change Operator 1 to Operator 2" can also include a click through which upon clicking on the comment, a table 740 can pop up which includes additional details, for example, relating to each of a plurality of operators 130, 132, 134, throughput time for each of the plurality of operators 130, 132, 134, and a rework rate, which illustrates if the print job is changed from one operator to another operator.

For example, using only machine learning, a recommendation can be made, for example, to the manager 140 of the print shop to change the operator 130 (O1) to operator 134 (O3) without any data points. In the absence of any details of past data, the analysis may not be entirely supported such that the manager may be hesitant to take the action as suggested. However, in accordance with an exemplary embodiment, with the application of process mining, the manager 140 (or user) of the print shop can visualize on a graphical user interface (GUI) that the recommendation is to change the operator from operator 1 130 to operator 2 132, which the manager can execute with confidence and as illustrated in FIG. 7 shows that the time for completing the job can be improved.

As shown in FIG. 7, a predefined deadline, for example, 5:00 PM to finish each of the print jobs is going to be met by jobs id1 and job id2, however, for job id3, the estimate deadline for completion of the job is by 6:00 PM. However, based on the recommendation from the method and system for efficient job processing and scheduling using process mining, by switching the operator on job id 3 to operator 2 from operator 1, the job can be finished sooner.

Figure 8:
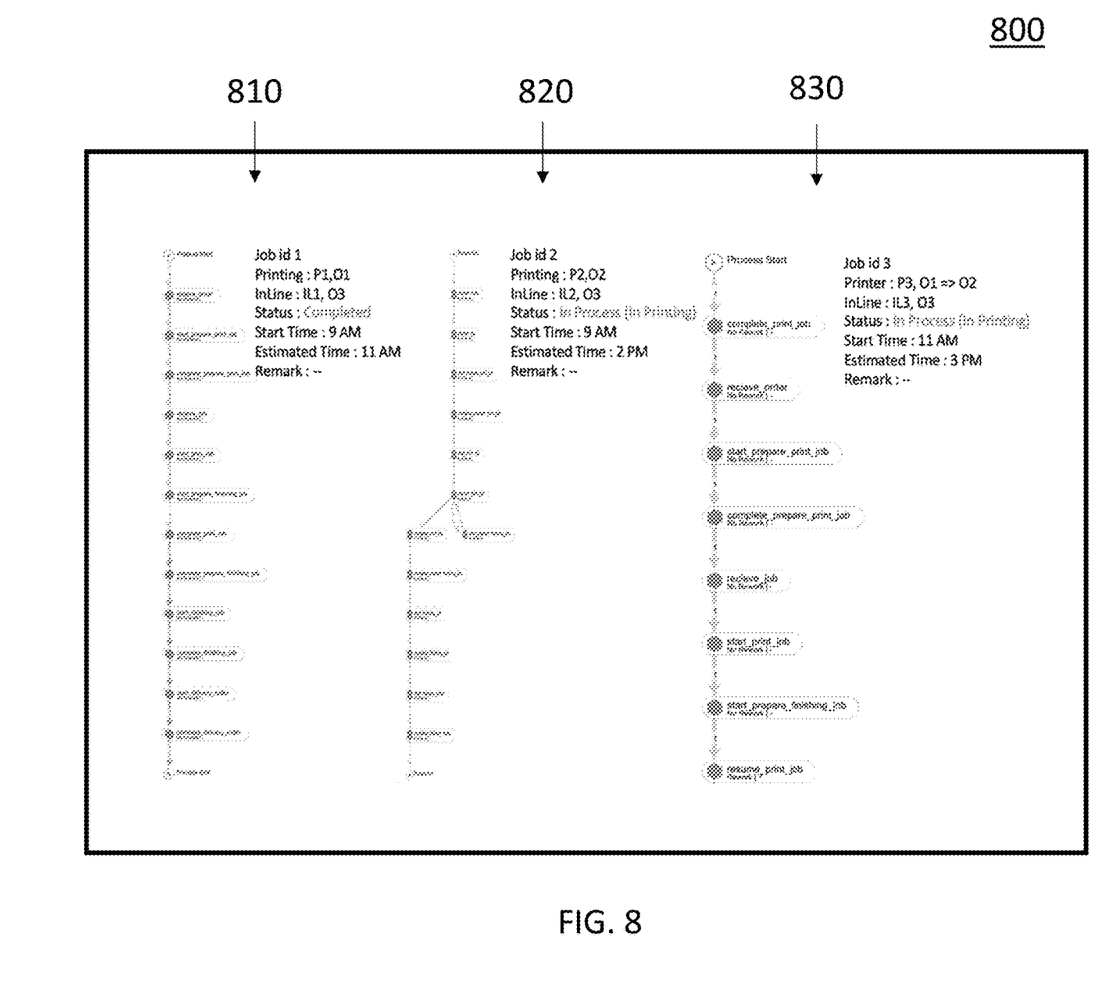
FIG. 8 is an illustration of another workflow visualization for a plurality of print jobs in accordance with an exemplary embodiment.

FIG. 8 is an illustration of another workflow visualization 800 for a plurality of print jobs in accordance with an exemplary embodiment in which a change of operators has occurred. As shown in FIG. 8, after simulation, the workflow visualization 800 can show for Job id 3 830 that by changing operator O1 130 to operator O2 132, the Job id 3 830 can be completed by 3:00 PM instead of 6:00 PM. In addition, for example, one or more of the other print jobs may be impacted by the change of operators. For example, Job id 2 820 which was previously expected to finish at 1:00 PM, is changed to 2:00 PM, which is still within, for example, the deadline of 5:00 PM, when the print shop closes. Job id 3 830, which was previously expected to finish at 6:00 PM, is changed to 3 PM. In addition, the overall productivity of the print shop 110, for example, for Job id 1 810, Job id 2 820, and Job id 3 830, can also be improved since the total job time has been reduced by 1 hour as compared to the previous assignment of operators without process mining.

Figure 9:
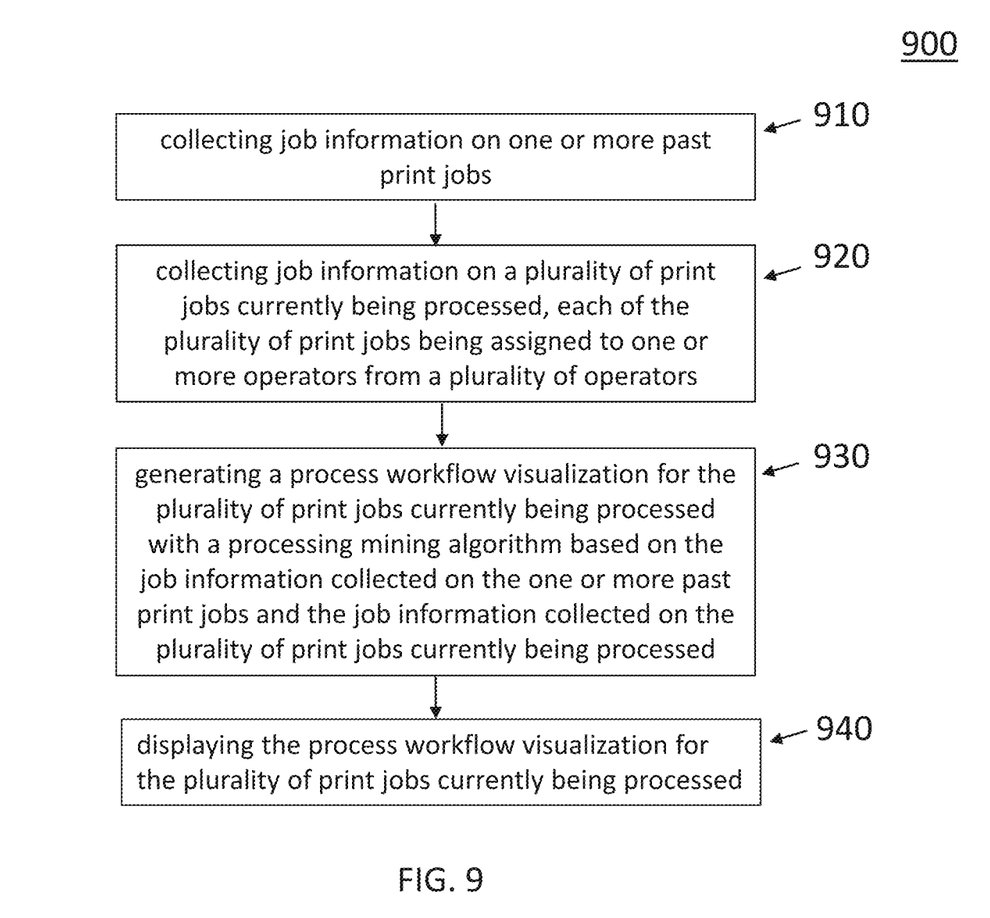
FIG. 9 is a flow chart illustrating a method for processing and scheduling print jobs on a plurality of printers in accordance with an exemplary embodiment.

FIG. 9 is a flow chart 900 illustrating a method for processing and scheduling print jobs on a plurality of printers in accordance with an exemplary embodiment. As shown in FIG. 9, in step 910, job information is collected on one or more past print jobs. In step 920, job information is collected on a plurality of print jobs currently being processed, each of the plurality of print jobs being assigned to one or more operators from a plurality of operators. In step 930, a process workflow visualization is generated for the plurality of print jobs currently being processed with a processing mining algorithm based on the job information collected on the one or more past print jobs and the job information collected on the plurality of print jobs currently being processed. In step 940, the process workflow visualization is displayed for the plurality of print jobs currently being processed.

In accordance with an exemplary embodiment, one or more of the plurality of print jobs currently being processed can be highlighted in the process workflow visualization when the one or more of the plurality of print jobs has a recommendation for improving a processing time of the one or more of the plurality of print jobs. In addition, for example, the recommendation for improving the processing time of the one or more of the plurality of print jobs can include recommending a change in an operator on the one or more of the plurality of print jobs currently being processed. The recommendation for the change in the operator on the one or more of the plurality of print jobs currently being processed can be, for example, based on a maintenance issue with one or more of the plurality of printers. The maintenance issue with the one or more of the plurality of printers can be related to one or more of: replacing or cleaning parts, color calibration, adding toner, machine failure, machine error status, out of paper or print media, or loading of paper or print media.

In accordance with an exemplary embodiment, the collected job information on the one or more past print jobs can be input into a machine learning service, and an estimated job process time for each of the plurality of print jobs currently being processed can be generated. In addition, the generated estimated job process time for each of the plurality of print jobs currently being processed can be used to recommend a change in one or more of the operators of the plurality of print jobs currently being processed.

In accordance with an exemplary embodiment, the method for processing and scheduling print jobs on a plurality of printers can further include obtaining an ideal job processing information and an ideal operator from the plurality of operators for each of the plurality of print jobs currently being processed based on the job information on the one or more past print jobs and the job information on the plurality of print jobs currently being with the processing mining algorithm.

In accordance with an exemplary embodiment, the collected job information on the one or more past print jobs and the collected job information on each of the plurality of print jobs currently being processed can include at least a job received time, a product type, job ticket settings, a page count, and an operator identifier. In addition, the collect job information on the plurality of print jobs currently being processed can further includes collecting a printer capability for each of the plurality of printers; collecting a status of each of the plurality of printers; collecting a maintenance schedule for each of the plurality of printers; and collecting an estimated print duration for each of the plurality of jobs. In accordance with an exemplary embodiment, at least one of the plurality of printers includes one or more finishers, and the method further includes collecting post processing information for each of the plurality of print jobs, the post processing information including information on the one or more finishers.

In accordance with an exemplary embodiment, the process workflow visualization for the plurality of print jobs currently being processed can be displayed on a graphical user interface of a client device, for example, within a print shop.

In accordance with an exemplary embodiment, each of the plurality of print jobs currently being processed can include a printer configured to print the print job and one or more finishers configured to enhance the printed print job. For example, the one or more finishers can include one or more of a stapler, a collator, a hole puncher, and a folding assembly.

In accordance with an exemplary embodiment, the methods and processes as disclosed can be implemented on a non-transitory computer readable medium. The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for processing and scheduling print jobs on a plurality of printers, the method comprising:
   collecting job information on one or more past print jobs;
   collecting job information on a plurality of print jobs currently being processed, each of the plurality of print jobs being assigned to one or more operators from a plurality of operators that operate the plurality of printers;
   generating a process workflow visualization for the plurality of print jobs currently being processed with a processing mining algorithm based on the job information collected on the one or more past print jobs and the job information collected on the plurality of print jobs currently being processed;
   displaying the process workflow visualization for the plurality of print jobs currently being processed; and
   highlighting one or more of the plurality of print jobs currently being processed in the process workflow visualization when the one or more of the plurality of print jobs has a recommendation for improving a processing time of the one or more of the plurality of print jobs, and wherein the recommendation for improving the processing time of the one or more of the plurality of print jobs further comprises:
      recommending a change in an operator on a printer of the one or more of the plurality of print jobs currently being processed.

2. The method according to claim 1, wherein the recommendation for the change in the operator on the one or more of the plurality of print jobs currently being processed is based on a maintenance issue with one or more of the plurality of printers.

3. The method according to claim 2, wherein the maintenance issue with the one or more of the plurality of printers is related to one or more of: replacing or cleaning parts, color calibration, adding toner, machine failure, machine error status, out of paper or print media, or loading of paper or print media.

4. The method according to claim 1, further comprising:
   inputting the collected job information on the one or more past print jobs into a machine learning service;
   generating an estimated job process time for each of the plurality of print jobs currently being processed; and
   using the generated estimated job process time for each of the plurality of print jobs currently being processed to recommend the change in the operator on the printer of the one or more of the plurality of print jobs currently being processed.

5. The method according to claim 1, further comprising:
   obtaining an ideal job processing information and an ideal operator from the plurality of operators for each of the plurality of print jobs currently being processed based on the job information on the one or more past print jobs and the job information on the plurality of print jobs currently being with the processing mining algorithm.

6. The method according to claim 1, wherein the collected job information on the one or more past print jobs and the collected job information on each of the plurality of print jobs currently being processed includes at least a job received time, a product type, job ticket settings, a page count, and an operator identifier.

7. The method according to claim 1, wherein the collect job information on the plurality of print jobs currently being processed further comprises:
   collecting a printer capability for each of the plurality of printers;
   collecting a status of each of the plurality of printers;
   collecting a maintenance schedule for each of the plurality of printers; and
   collecting an estimated print duration for each of the plurality of jobs.

8. The method according to claim 7, wherein at least one of the plurality of printers includes one or more finishers, comprising:
   collecting post processing information for each of the plurality of print jobs, the post processing information including information on the one or more finishers.

9. The method according to claim 1, wherein the process workflow visualization for the plurality of print jobs currently being processed is displayed on a graphical user interface of a client device.

10. The method according to claim 1, wherein each of the plurality of print jobs currently being process includes a printer configured to print the print job and one or more finishers configured to enhance the printed print job.

11. The method according to claim 10, wherein the one or more finishers includes one or more of a stapler, a collator, a hole puncher, and a folding assembly.

12. A non-transitory computer readable medium (CRM) storing computer program code executed by a computer processor that performs a process for processing and scheduling print jobs on a plurality of printers, the process comprising:
   collecting job information on one or more past print jobs;
   collecting job information on a plurality of print jobs currently being processed, each of the plurality of print jobs being assigned to one or more operators from a plurality of operators that operate the plurality of printers;

generating a process workflow visualization for the plurality of print jobs currently being processed with a processing mining algorithm based on the job information collected on the one or more past print jobs and the job information collected on the plurality of print jobs currently being processed;

displaying the process workflow visualization for the plurality of print jobs currently being processed; and highlighting one or more of the plurality of print jobs currently being processed in the process workflow visualization when the one or more of the plurality of print jobs has a recommendation for improving a processing time of the one or more of the plurality of print jobs, and wherein the recommendation for improving the processing time of the one or more of the plurality of print jobs further comprises:

recommending a change in an operator on a printer of the one or more of the plurality of print jobs currently being processed.

13. The non-transitory computer readable medium according to claim 12, wherein the recommendation for the change in the operator on the one or more of the plurality of print jobs currently being processed is based on a maintenance issue with one or more of the plurality of printers.

14. A system for processing and scheduling print jobs, the system comprising:

one or more client devices configured to generate print jobs;

a plurality of printers configured to print the print jobs; and a server having a memory and a processor, the processor configured to:

collect job information on one or more past print jobs;

collect job information on a plurality of print jobs currently being processed, each of the plurality of print jobs being assigned to one or more operators from a plurality of operators that operate the plurality of printers;

generate a process workflow visualization for the plurality of print jobs currently being processed with a processing mining algorithm based on the job information collected on the one or more past print jobs and the job information collected on the plurality of print jobs currently being processed;

display the process workflow visualization for the plurality of print jobs currently being processed; and highlight one or more of the plurality of print jobs currently being processed in the process workflow visualization when the one or more of the plurality of print jobs has a recommendation for improving a processing time of the one or more of the plurality of print jobs, and wherein the recommendation for improving the processing time of the one or more of the plurality of print jobs further comprises:

recommending a change in an operator on a printer of the one or more of the plurality of print jobs currently being processed.

* * * * *